Jan. 24, 1956   R. E. DUVAL   2,732,268
DELTA-RING HYDRAULIC PACKING
Filed Aug. 1, 1952
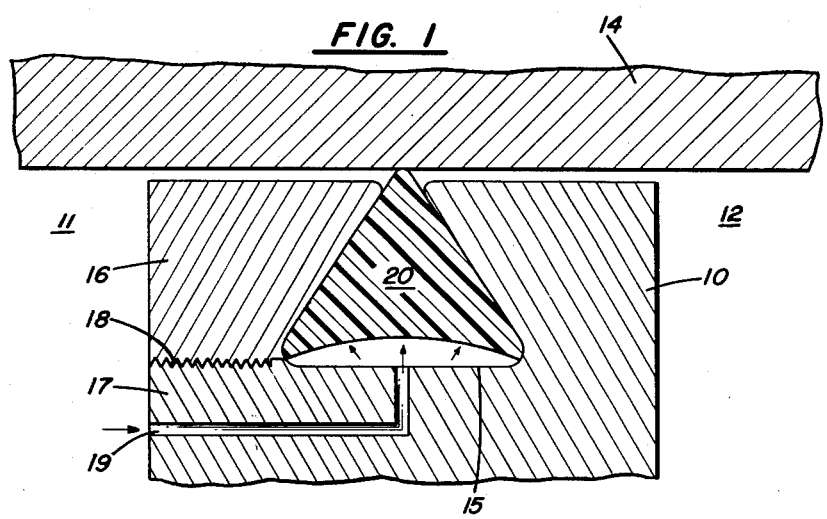
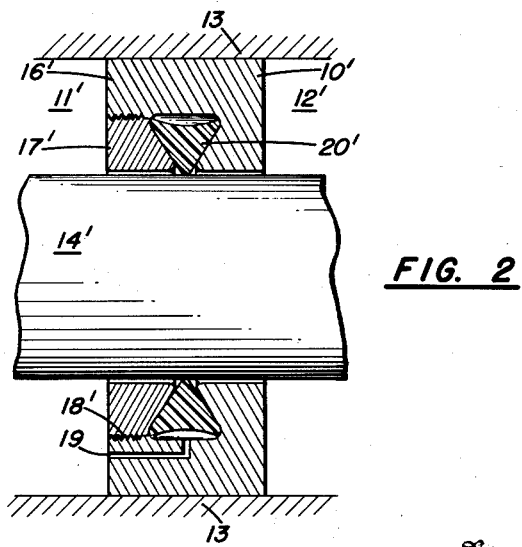
Inventor
ROBERT E. DUVAL United States Patent Office 2,732,268
Patented Jan. 24, 1956

2,732,268
DELTA-RING HYDRAULIC PACKING

Robert E. Duval, United States Navy, assignor, by mesne assignments, to the United States of America Application August 1, 1952, Serial No. 302,203

2 Claims. (Cl. 309—31)

The present invention relates to packing glands and particularly to high pressure glands for use with hydraulic systems in aircraft and the like.

Hydraulic systems in aircraft and in other specialized applications require packing glands able to withstand high pressures under a wide range of temperatures. Conventional O-rings made of polyethylene, Teflon, nylon, and rubber-like polymers are subject to serious defects when used at elevated temperatures and pressures. Extrusion of the O-ring from the groove, swelling of the ring due to miscibility of the plasticizer used in forming the material of the ring, and hardening or set of the ring under conditions of zero pressure and non-use are common defects in the gland packings of this type.

The principal object of the present invention is to provide a basically new design for a packing gland or ring for use under pressures considerably higher than the pressures now used with O-rings without increasing the frictional drag.

A further object of the invention is to provide a packing gland or ring of simple design and one which permits a wide range of tolerances in size. Another object of the invention is to provide for the use of plastics and other resilient materials in packing glands and rings.

A still further object of the invention is to provide a ring or seal of plastic or other resilient material and of such design that the extrusion from the gland or holder against the bearing surface is readily controlled.

Another object is to provide a packing gland or ring having a very low coefficient of friction when compared to conventional O-rings under identical conditions of use.

These and other objects and advantages of the invention hereinafter become more fully apparent from the following description of the annexed drawings, which illustrate a preferred embodiment of the invention, and wherein:

Fig. 1 is a detailed view in section of a portion of the invention, and

Fig. 2 is a plan view partly in section of the invention in use as a packing gland positioned on a shaft.

Referring to the drawings in which similar numerals indicate similar parts in the two views, 10 or 10' represents a body which may be a seal, piston, or other pressure restraining device or just a gland separating chambers 11 and 12 or 11' or 12'. As shown in Fig. 1, 14 is a portion of the casing in which the piston 10 works. The groove 15 is formed between the main body portion 17 and the annular portion 16 threaded to the body portion 17 at 18. In Fig. 2, 10' represents a packing gland body and in this embodiment it may be secured to the casing 13. Rod 14' reciprocates in casing 13, the pressure in chamber 11' being greater than in chamber 12'. Body 10' has groove 15 formed between its two parts, 16' and 17', which are here shown as assembled by means of the matching screw threads 18'. Passage 19 connects the groove 15 to the high pressure chamber 11' and applies pressure to the triangular packing or ring 20' the apex of which bears against the rod 14'.

Although the grooves and the rings are here illustrated as having the shape of an equilateral triangle in cross-section, the invention is not to be construed as limited to such a configuration and may be of any triangular cross-section in which the apex ridge of the ring presents a small area of surface to the moving surface, and in which the ring is confined in the groove by the sloping walls of the groove at any desired angle with respect to the moving surface.

Similarly, although polymerized materials have been found to be adequate and useful from which to construct the ring of this invention, other materials may be used and the invention is not limited to any particular material. Further, while here illustrated and described as being useful with rods, pistons, or other reciprocating surfaces, the invention may be equally useful and effective as a seal on a rotary surface such as on propeller shafts and the like.

The passage 19 applies the hydraulic pressure in chamber 11 or 11' to the bottom of the packing and a greater pressure in this chamber may be maintained than if an O-ring were used without any increase in frictional drag. Continuous pressurization in chamber 11 or 11' is desirable to hold the packing against the moving rod or cylinder wall. It was found that a polyethylene packing at 3000 p. s. i. developed less than one-half the running friction of an equivalent O-ring at 1500 p. s. i.

What is claimed is:

1. A packing gland for providing a seal against the working surface of a moving body comprising, in combination, a packing holder formed with a groove of substantially triangular cross-section having convergent side walls, said groove forming a narrow slit opening adjacent said working surface, a packing of substantially triangular cross-section mounted in said groove and having convergent side walls and a base, the convergent walls of the groove formed in said packing holder engaging substantially the entire surfaces of the convergent side walls of the triangular packing, said packing having an apex extending through said slit to engage said working surface, and pressure means biased against the base of said packing to insure a sealing engagement of the apex of said packing against said working surface, whereby only the narrow apex of the triangular packing is exposed for engagement with the working surface and the greater portion of the packing is enclosed by the convergent side walls of the groove formed in said holder.

2. A packing construction for pistons or the like having a surrounding cylindrical surface comprising, a piston having a main body portion and a removable portion, said main body portion having a first annular surface, said main body portion being cut away adjacent said first annular surface to form an annular groove having two walls converging to form in cross-section a base and one side of a triangular groove, said removable body portion being threadedly connected to said main body portion and having a second annular surface axially spaced from said first annular surface, the removable body portion being cut away adjacent said second annular surface to form a wall which is the second side of said triangular groove, the base of the triangular groove being remote from said annular surfaces and the space between said annular surfaces forming a narrow slit at the apex of the triangular groove, packing material lying in said triangular groove in contact with only the two side walls thereof and being substantially triangular in cross-section, the sides of the triangular packing material having surfaces complementary to the two side walls of the groove, the surfaces of the side walls of the groove engaging substantially the entire surfaces of the complementary sides of the packing material, the apex portion of the packing material projecting outwardly beyond said annular surfaces through said narrow slit to engage said surrounding cylindrical surface, said main body portion having a hollow passage extending into the base of said groove for the application of pressure to the innermost area of said packing material to maintain sealing engagement between the apex portion of the packing material and the surrounding cylindrical surface.

References Cited in the file of this patent

UNITED STATES PATENTS

| | | |
|---|---|---|
| 1,618,511 | Burstall | Feb. 22, 1927 |
| 1,859,436 | Durdin | May 24, 1932 |
| 1,921,996 | Van Hooydonk | Aug. 8, 1933 |
| 2,022,599 | Leuschner | Nov. 26, 1935 |